(12) United States Patent
Hornung et al.

(10) Patent No.: US 7,818,508 B2
(45) Date of Patent: Oct. 19, 2010

(54) SYSTEM AND METHOD FOR ACHIEVING ENHANCED MEMORY ACCESS CAPABILITIES

(75) Inventors: Bryan Hornung, Richardson, TX (US); Erin A. Handgen, Fort Collins, CO (US); Gary Gostin, Richardson, TX (US); Craig Warner, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 726 days.

(21) Appl. No.: 11/741,453

(22) Filed: Apr. 27, 2007

(65) Prior Publication Data

US 2008/0270743 A1 Oct. 30, 2008

(51) Int. Cl.
*G06F 13/00* (2006.01)

(52) U.S. Cl. ............... 711/141; 711/104; 711/108; 711/157; 711/202

(58) Field of Classification Search .......... 711/141, 711/104, 108, 157, 202
See application file for complete search history.

(56) References Cited

U.S. PATENT DOCUMENTS

| | | | |
|---|---|---|---|
| 5,787,095 A | 7/1998 | Myers et al. | |
| 5,842,031 A | 11/1998 | Barker et al. | |
| 6,173,383 B1 * | 1/2001 | Casamatta | 711/202 |
| 6,421,775 B1 | 7/2002 | Brock et al. | |
| 6,457,100 B1 | 9/2002 | Ignatowski et al. | |
| 6,668,308 B2 | 12/2003 | Barroso et al. | |
| 6,671,792 B1 | 12/2003 | McAllister | |
| 6,684,343 B1 | 1/2004 | Bouchier et al. | |
| 6,725,317 B1 | 4/2004 | Bouchier et al. | |
| 6,848,003 B1 | 1/2005 | Arimilli et al. | |
| 6,910,062 B2 | 6/2005 | Arimilli et al. | |
| 6,918,052 B2 | 7/2005 | Bouchier et al. | |
| 6,973,517 B1 | 12/2005 | Golden et al. | |
| 2002/0144063 A1 | 10/2002 | Peir et al. | |
| 2003/0009641 A1 | 1/2003 | Arimilli et al. | |
| 2003/0131067 A1 | 7/2003 | Downer et al. | |
| 2004/0111570 A1 * | 6/2004 | Arimilli et al. | 711/154 |
| 2004/0268044 A1 | 12/2004 | Heller, Jr. et al. | |
| 2005/0021913 A1 | 1/2005 | Heller, Jr. | |
| 2005/0240649 A1 | 10/2005 | Elkington et al. | |
| 2005/0246508 A1 | 11/2005 | Shaw | |
| 2006/0031672 A1 | 2/2006 | Soltis et al. | |

OTHER PUBLICATIONS

Managing Superdome Complexes: A Guide for HP-UX System Administrators, HP 9000 Computers, Edition 1, Dec. 2000 (349 pages).

* cited by examiner

*Primary Examiner*—Hong Kim
*Assistant Examiner*—Jae U Yu (57) ABSTRACT

A computer system, related components such as a processor agent, and related method are disclosed. In at least one embodiment, the computer system includes a first core, at least one memory device including a first memory segment, and a first memory controller coupled to the first memory segment. Further, the computer system includes a fabric and at least one processor agent coupled at least indirectly to the first core and the first memory segment, and also coupled to the fabric. A first memory request of the first core in relation to a first memory location within the first memory segment proceeds to the first memory controller by way of the at least one processor agent and the fabric.

17 Claims, 3 Drawing Sheets

SYSTEM AND METHOD FOR ACHIEVING ENHANCED MEMORY ACCESS CAPABILITIES

CROSS-REFERENCE TO RELATED APPLICATIONS

STATEMENT REGARDING FEDERALLY SPONSORED RESEARCH OR DEVELOPMENT

FIELD OF THE INVENTION

The present invention relates to computer systems and, more particularly, relates to systems and methods within computer systems that govern the accessing of memory.

BACKGROUND OF THE INVENTION

Given the high processing speeds that can be achieved by today's computer processing units, memory access speed has become a limiting factor in many computer systems. In order to reduce memory latency and avoid "hot spots" in which certain memory resources are overly taxed, many computer systems employ a shared memory system in which the memory is divided into multiple blocks, and where multiple processing units are allowed to access the same blocks of the memory at different or even substantially the same times. In some such computer systems, each block of memory is controlled by a respective memory controller that is capable of communicating with multiple processing units of the computer system.

Some computer systems employ sockets that each have multiple processing units and, in addition, also typically each have their own respective memory controllers that manage blocks of memory capable of being accessed by one or more of the processing units of the respective sockets. To reduce memory latency in some such systems, processing units located on a given socket may be able to access memory blocks controlled by memory controllers located on other sockets. Such operation, in which one socket directly accesses the memory resources of another socket, is commonly referred to as "memory interleaving", and systems employing such interleaving capability are commonly referred to as non-uniform memory access (NUMA) systems.

Yet the degree to which memory interleaving can be effectively implemented in conventional computer systems is limited. Memory interleaving as described above is typically restricted to small numbers of sockets, for example, to four sockets or less. To achieve systems having larger numbers of sockets that are capable of accessing each other's memory resources, the memory controllers of the sockets cannot be directly connected to the processing units of other sockets but rather typically need to be connected by way of processor agents. Yet the implementation of such systems employing processor agents tends to be complicated and inefficient both in terms of the operation of the processor agents and in terms of the extra burdens that are placed upon the operating system and applications running on such systems. For example, in such systems it is desirable that the operating system/applications be capable of adapting to changes in the memory architecture to avoid inefficient operation, something which is often difficult to achieve.

For at least these reasons, it would be advantageous if an improved system and method for achieving enhanced memory access capabilities in computer systems could be developed. More particularly, it would be advantageous if, in at least some embodiments, such a system and method enabled enhanced memory interleave capabilities in computer systems having large numbers of sockets with multiple processors and memory controllers, such that the processors of the various sockets could access different memory blocks controlled by memory controllers of other sockets in a manner that, in comparison with conventional systems, reduced memory latency and/or the occurrence of "hot spots".

SUMMARY OF THE INVENTION

In at least some embodiments, the present invention relates to a computer system that includes a first core, at least one memory device including a first memory segment, and a first memory controller coupled to the first memory segment. The computer system further includes a fabric and at least one processor agent coupled at least indirectly to the first core and the first memory segment, and also coupled to the fabric. A first memory request of the first core in relation to a first memory location within the first memory segment proceeds to the first memory controller by way of the at least one processor agent and the fabric.

Additionally, in at least some embodiments, the present invention relates to a processor agent capable of being incorporated into a computer system. The processor agent includes a first caching agent and a first coherency controller. The first caching agent is configured to convert a first physical address relating to a memory location into a first fabric address, and the first coherency controller is configured to convert the first fabric address into at least one of the first physical address and a second address relating to the memory location.

Further, in at least some embodiments, the present invention relates to a method of accessing a memory location in a computer system. The method includes receiving, at a first processor agent, a first signal indicative of a memory request generated by a core, and communicating a second signal based upon the first signal from the first processor agent to one of the first processor agent and a second processor agent, via a fabric. The method also includes sending a third signal based upon the second signal from the one processor agent, for receipt by a memory controller, whereby the memory controller in response to receiving the third signal is capable of accessing the memory location.

DETAILED DESCRIPTION OF THE PREFERRED EMBODIMENT

Figure 1:
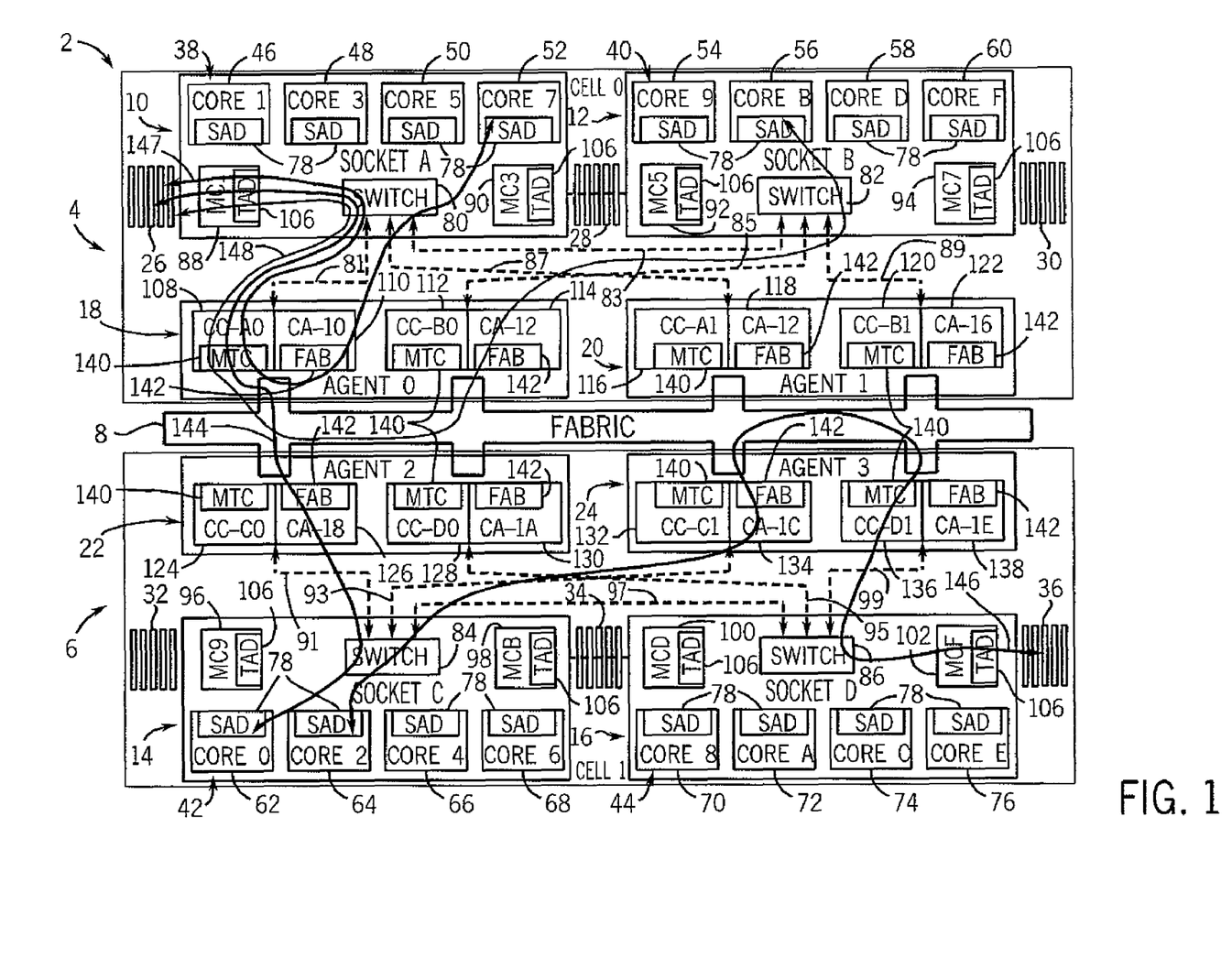
FIG. 1 shows in schematic form components of a computer system divided into multiple partitions, where each partition includes memory blocks and multiple sockets having multiple processing units and memory controllers for sharing and accessing, via communication links, those memory blocks located on different partitions, in accordance with one embodiment of the present invention.

Referring to FIG. 1, components of an exemplary multi-processor computer system 2, divided into multiple partitions, are shown in a simplified schematic form in accordance with at least one embodiment of the present invention. As shown, the computer system 2 in the present embodiment in particular includes two partitions, namely, a first cell 4, a second cell 6, and a fabric 8 to facilitate communication between those two cells. The two cells 4, 6 can be understood to be formed on two separate printed circuit boards that can be plugged into, and connected by, a backplane (on which is formed or to which is coupled the fabric 8). Although the computer system 2 of the present embodiment includes only the first and second cells 4 and 6, it is nevertheless intended to be representative of a wide variety of computer systems having an arbitrary number of cells and/or circuit boards. For example, in other embodiments, only a single cell or more than two cells are present.

In at least some embodiments, the computer system 2 can be a sx 1000 super scalable processor chipset available from the Hewlett-Packard Company of Palo Alto, Calif., on which are deployed hard partitions formed by the cells 4, 6 (also known as "nPars"). Hard partitions formed by the cells 4, 6 allow the resources of a single server to be divided among many enterprise workloads and to provide different operating environments (e.g., HP-UX, Linux, Microsoft Windows Server 2003, OpenVMS) simultaneously. Such hard partitions also allow computer resources to be dynamically reallocated. Although the computer system 2 can be the super scalable processor chipset mentioned above, it need not be such a chipset and instead in other embodiments can also take a variety of other forms.

Each of the cells 4, 6 is capable of supporting a wide variety of hardware and software components. More particularly as shown, each of the cells 4, 6 includes a respective pair of sockets, namely, sockets 10 and 12 on the first cell 4 and sockets 14 and 16 on the second cell 6. Additionally, main memory of the cells 4, 6 is divided into multiple memory segments including memory segments or blocks 26, 28, 30 on the first cell 4 and memory segments or blocks 32, 34, 36 on the second cell 6. Additionally, each of the cells 4, 6 includes a respective pair of processor agents (PAs), namely, PAs 18 and 20 on the first cell 4 and PAs 22 and 24 on the second cell 6. In other embodiments, one or both of the cells 4, 6 can also include other components not shown, for example, input/output systems, and power management controllers.

In particular with respect to the sockets 10-16, they serve as a platform for supporting multiple hardware components. These hardware components include respective sets of cores or processing units 38, 40, 42, 44 on each respective socket, respective pairs of memory controllers (MCs) 88 and 90, 92 and 94, 96 and 98, and 100 and 102 on each respective socket, and respective switches 80, 82, 84 and 86 on each respective socket. With respect to the sets of cores 38, 40, 42, 44 on each respective socket 10, 12, 14, 16 in particular, the socket 10 includes four cores 46, 48, 50, 52, the socket 12 includes four cores 54, 56, 58, 60, the socket 14 includes four cores 62, 64, 66, 68, and the socket 16 includes four cores 70, 72, 74, 76. Notwithstanding the fact that, in the present embodiment, each of the sockets 10, 12, 14 and 16 has four cores, the present invention is intended to encompass a variety of other embodiments of sockets having other numbers of cores, such as sockets having less than four cores (or even only a single core) or more than four cores.

The switches 80-86 on each socket are crossbars capable of routing communications to and from the other components located on that socket. More particularly, the switch 80 allows for the routing of communications from and to any of the cores 46-52 and MCs 88, 90 on the socket 10, the switch 82 allows for the routing of communications from and to any of the cores 54-60 and MCs 92, 94 on the socket 12, the switch 84 allows for the routing of communications from and to any of the cores 62-68 and MCs 96, 98 on the socket 14, and the switch 86 allows for the routing of communications from and to any of the cores 70-76 and MCs 100, 102 on the socket 16. Additionally, each of the switches 80-86 also allows for the routing of communications to and from the respective socket 10-16 on which the respective switch is mounted, from and to the respective pairs of PAs 18, 20 or 22, 24 of the cells 4 or 6, respectively, on which the switch is mounted. That is, each of the switches 80, 82 is capable of directly communicating with each of the PAs 18, 20 as shown by dashed communication links 81, 85, 87 and 89, respectively, while each of the switches 84, 86 is capable of directly communicating with each of the PAs 22, 24 as shown by dashed links 91, 93, 95 and 99, respectively. Further, the switches 80, 82 and the switches 84, 86 are capable of communicating with each other as shown by dashed communication links 83 and 97 respectively.

Typically, the cores 46-76 of the sets of cores 38-44 located on the sockets 10-16 respectively are chips that are coupled to their respective sockets by way of electrical connectors, and are intended to be representative of a wide variety of central processing units. For example, in the present embodiment, the cores 46-76 are Itanium processing units as are available from the Intel Corporation of Santa Clara, Calif. In other embodiments, one or more of the cores 38-44 can take other forms including, for example, Xeon, Celeron and Sempron. In alternate embodiments, one or more of the cores can be another type of processing unit other than those mentioned above. Different cores on a given socket, on different sockets, and/or on different cells need not be the same but rather can differ from one another in terms of their types, models, or functional characteristics.

In other embodiments, one or more of the sockets 10-16 can include components other than or in addition to those mentioned above. Also, notwithstanding the fact that the present embodiment has two sockets on each of the first and second cells 4 and 6 respectively, one or more cells in other embodiments can either have a single socket or possibly more than two as well. In many embodiments, the number of sockets will exceed (possibly even greatly exceed) the number of sockets shown in FIG. 1. For example, in some embodiments, the number of sockets could be up to 64 different sockets. The present embodiment, with its limited numbers of cells 4, 6 and sockets 10, 12, 14 and 16, is provided as an exemplary embodiment of the present invention due to the ease with which it can be described and illustrated.

Internally, each of the cores of the sets of cores 38-44 in the present embodiment includes a variety of hardware and software components capable of supporting a wide variety of applications as well as tasks relating to the management of the various hardware and software components present on the cores as adapted in accordance with various embodiments of the present invention. More particularly, each of the cores includes a cache memory (not shown), which is smaller and faster in operation than the memory segments 26-36 of main memory discussed above, and which is capable of storing blocks of frequently used data accessed from the main memory in order to reduce the impact of memory latency that occurs when accessing the main memory (discussed in more detail below in regards with FIG. 2). Notwithstanding the presence of the cache memories, one or more of the memory segments 26-36 of the main memory still need to be accessed on a regular basis, for example, upon failures to locate requested information in the cache memories.

Further as shown, each of the cores 46-76 has a respective logic block referred to as a Source Address Decoder (SAD)

78. Depending upon the embodiment, the SADs 78 can be implemented as hardware components and/or can reside as software. As will be described in further detail below, the SADs 78 process signals arising from the cores 46-76 and determines how to route those signals to appropriate ones of the PAs 18-24 via the respective switches 80-86 of the respective sockets 10-18 on which the respective cores are located. In the present embodiment, each of the SADs 78 is pre-programmed to direct requests to the PAs 18-24 in a particular manner as explained in more detail below, Conversely, signals returning from the PAs 18-24 are processed the SADs 78 for receipt by the cores 46-76. Typically, the SADs 78 associated with any of the cores 46-60 of the first cell 4 will only send requests to the PAs 18, 20 of that cell, while the SADs 78 associated with any of the cores 62-76 of the second cell 6 will only send requests to the PAs 22, 24 of that cell.

As for the MCs 88-102, these are responsible for managing and accessing the various memory segments 26-36 in response to read/write requests received from the cores 46-76, and for relaying signals back from those memory segments to the cores, as described in further detail below. The MCs 88-102 can be hardware chips such as application specific integrated circuit (ASICs) that are connected to the sockets 10-16 by way of electrical connectors. In other embodiments, one or more of the MACs 88-102 can be other type(s) of MCs. Additionally, while in the present embodiment two of the MCs 88-102 are provided on each of the sockets 10-16, number of MCs per socket can vary in other embodiments (e.g., there can be only a single MC on each socket or possibly more than two as well).

Further as shown, each of the MCs 88-102 includes a respective logic block referred to as a Target Address Decoder (TAD) 106. As will be described in further detail below, the TADs 78 process signals arriving from the cores 46-76 and determines how to convert between (e.g., decode) memory address information received in those signals and memory locations within the memory segments 26-36. The TADs 106 also facilitate the return of information from the memory segments 26-36 back toward the cores 46-76. In the present embodiment, each of the TADs 106 can be implemented in either hardware or software, and is pre-programmed to convert between memory bank addresses and memory locations inside the memory segments 26-36.

With respect to the main memory itself, as discussed above it is divided into multiple disjointed memory segments including, for example, the memory segments 26-36 of FIG. 1. The particular manner of sub-division of the main memory into multiple memory segments can vary depending upon the embodiment and upon various factors, for example, the requirements of the applications running on the cores 46-76. In at least some embodiments, the memory segments 26-36 are organized as dual in-line memory modules (DIMMs) that are respectively connected to one or more of the MCs 88-102 by way of electrical connectors. More particularly, in the present embodiment, the memory segment 26 and 30 are controlled by the MCs 88 and 94, respectively, while the memory segment 28 is controlled by both the MC 90 and the MC 92. Similarly, the memory segments 32 and 36 are respectively controlled by the MCs 96 and 102, respectively, while the memory segment 34 is managed by both the MC 98 and 100.

In accordance with the present embodiment of the invention, all read/write memory requests originating from any and all of the cores 46-76 are routed to the MCs 88-102 not merely by way of the switches 80-86 but rather by way of one or more of the PAs 18-24 as well as by way of the fabric 8. Likewise, all signals sent from the MCs 88-102 to the cores 46-76 are provided via one or more of the PAs 18-24 as well as by way of the fabric, rather than merely by way of the switches 80-86. To further illustrate this manner of communicating with memory, FIG. 1 shows four exemplary communication paths 144, 146, 147 and 148 that are established between certain of the cores 46-76 and certain of the MCs 88-102 (and the associated memory segments 26-36). As shown, the first path 144 shows the core 62 accessing the memory segment 26 by way of the MC 88, the PAs 22 and 18, the switches 84 and 80 and the fabric 8. By comparison, the second path 146 shows the core 64 accessing the memory segment 36 by way of the MC 102, the PA 24, the switches 84 and 86 and the fabric 8, while the third path 147 shows the core 52 accessing the memory segment 26 by way of the MC 88, the PA 18, the switch 80 and the fabric 8. As for the fourth communication path 148, it shows the core 56 accessing the memory segment 26 by way of the MC 88, the PA 18, the switches 80 and 82 and the fabric 8. In general as shown, the communication paths 144, 146, 147 and 148 each proceed from one of the switches 80-86 to another, or possibly back to the same switch, via the fabric 8, one or more of the PAs 18-24, and one or more of the communication links 81-99.

As indicated by each exemplary scenario represented by the paths 144, 146, 147 and 148, a memory request concerning a memory location sent by a given core on a given socket of a given cell is directed first (by way of the switch of the socket) to a first PA that is on the same cell as the requesting core. The first PA in response provides a signal to the fabric 8, which then directs the signal to a second PA that is on the same cell as the MC governing the memory segment on which is located the requested memory location. The second PA in turn provides a signal to that MC, which results in the desired accessing of the requested memory location. From the exemplary communication paths 144, 146, 147 and 148, it should be evident that the accessing of memory occurs by way of the fabric and two PAs (or possibly only one PA where the requesting core and MC governing the requested memory location are on the same cell) in response to all memory requests, regardless of whether the requested memory location is governed by an MC that is on the same socket and/or cell or a different socket and/or cell than the core issuing the memory request.

The above-described manner of operation illustrated by the paths 144-148, given its use of the PAs 18-24 (and the fabric 8) as intermediaries, can be termed "agent access memory". Due to the role of the fabric 8 and the PAs 18-24 as intermediaries, the design and operational characteristics of the fabric and the PAs are of particular significance in implementing agent access memory. With respect to the fabric 8 in particular, it is a hardware device formed as part of (or connected to) the backplane of the computer system 2. In the present embodiment, the fabric 8 is designed as a hierarchy of switches (e.g., crossbars) albeit in other embodiments it can be designed in alternative forms including for example, point-to-point or ring implementations. In alternate embodiments, other implementations other than those mentioned above can be used for the fabric 8. As noted above, all requests to access any of the memory segments 26-36 are directed through the fabric 8 irrespective of the location of the memory segment relative to the originating core 46-76. Each of the cells 4 and 6 are connected to the fabric during configuration when the cells are installed on the computer system 2. As will be described further below, signals communicated onto the fabric 8 must take on fabric (or global) addresses that differ from the physical addresses employed by the signals when outside of the fabric.

As for the PAs 18-24, each of the PAs 18-24 can be an integrated circuit (IC) chip albeit, in other embodiments, one or more of the PAs 18-24 can be another type of IC chip or take other form(s). As already indicated above, the PAs 18-24 form an intermediary by which signals directed from the cores 46-76 and/or the MCs 88-102 by way of the switches 80-86 are provided to the fabric 8, and vice-versa. Further, although not shown, the PAs 18-24 also are typically (albeit need not be) coupled to one or more input/output (I/O) subsystems of the first and second cells 4 and 6 respectively, such that communications between those I/O subsystems and the cores 46-76 also is possible.

More particularly as shown in FIG. 1, each of the PAs 18-24 has located thereon two coherency controllers (CCs), namely, CCs 108 and 112 on the PA 18, CCs 116 and 120 on the PA 20, CCs 124 and 128 on the PA 22, and CCs 132 and 136 on the PA 24. In addition to the CCs, each of the PAs 18-24 also has located thereon two caching agents (CAs), namely, CAs 110 and 114 on the PA 18, CAs 118 and 122 on the PA 20, CAs 126 and 130 on the PA 22, and CAs 134 and 138 on the PA 24. As illustrated by the communication links 144-148, the CCs 108, 112, 116, 120, 124, 128, 132, 136 in particular process signals that are being directed toward, or received from, the MCs 88-102 (via the switches 80-86). In contrast, the CAs 110, 114, 118, 122, 126, 130, 134 and 138 process signals that are being received from, or directed toward, the cores 46-76 (via the switches 80-86).

The CCs and CAs serve several purposes. To begin with, the CCs are particularly responsible for providing coherency control within the computer system 2 relating to the accessing of the memory segments 26-36 by way of the MCs 88-102. Cache coherency issues can arise since, in addition to residing within home memory segments, more recent copies of memory locations can also be resident within one or more local cache memories of the cores 46-76. To maintain a consistent, coherent view of main memory, the CCs employ a directory based cache coherency control protocol, which is described further below. Although such a coherency protocol can be employed, it should be understood that in alternate embodiments other coherency protocols can be used including for example, invalidate protocols such as the MESI and update protocols such as the snooping protocol.

In the present embodiment in which the CCs employ a directory based cache coherency protocol, each of the CCs maintains a directory (for example, a table) for each memory location of the main memory. Each row of the directory of a given CC includes information indicating which of the memory segments 26-36 is the home of each memory location, as well as information indicating which of the caches of the cores 46-76 has the most updated copy of that location. Each location of the directory can be accessed by a subset of the address bits. By searching through its directory, the given CC can also determine if alternate updated copies of that memory location exist within another one or more of the cores. If so, asynchronous signals or "snoops" can be issued to the core holding the updated copy of the memory location for retrieval, thus resulting in the returning of the most updated copy of the memory location in response to a read/write request.

As shown, each of the CCs 108, 112, 116, 120, 124, 128, 132, and 136 in particular includes an instance of a Memory Translation Cam (MTC) 140. The MTC 140 of each CC, which can be implemented as a pre-programmed logic block, is responsible for converting fabric addresses (for signals being received off of the fabric 8) into local physical addresses that can be then used by the MCs 88-102 that are in communication with the respective CCs (e.g., to retrieve the information from the requested memory location). Also, the MTCs 140 of the CCs are used to determine the coherency flow of the received requests. To issue snoops, a global address routed via the fabric 8 can be converted to a local physical address by way of one of the MTCs 140. In general, a local physical address has the same format as the address specified by the requesting core while making the request, albeit the address bits used to determine interleaving can in some circumstances be omitted. More particularly, in some embodiments, the MTCs 140 also are provided with information necessary to generate "MC views" of the physical addresses. Such addresses have the same format as the core physical addresses, but the address bits used to determine interleaving can be omitted (the MC view of the address can not be used for the snoops to the cores).

In addition to the CCs, each of the PAs 18-24 also has located thereon two caching agents (CAs), namely, CAs 110 and 114 on the PA 18, CAs 118 and 122 on the PA 20, CAs 126 and 130 on the PA 22, and CAs 134 and 138 on the PA 24. With respect to the CAs 110, 114, 118, 122, 126, 130, 134 and 138, these are intended to perform several functions. To begin, in the present embodiment, the CAs are responsible for executing the coherency flow determined by the CCs (e.g., by executing the snoops issued by the CCs). Additionally, the CAs perform address abstraction, by which local physical addresses referenced in signals received from the cores 46-76 are converted into fabric (global) addresses appropriate for the fabric 8, and vice-versa. In other embodiments, one or more of the CAs 110, 114, 118, 122, 126, 130, 134 and 138 can be programmed to perform other functions than those mentioned above.

More particularly with respect to the performing of address abstraction, each of the CAs 110, 114, 118, 122, 126, 130, 134 and 138 includes a respective Fabric Abstraction Block (FAB) 142 by which the respective CA converts local physical addresses such as those arriving on memory request signals from the cores 46-76 (via the switches 80-86) into fabric (global) addresses suitable for determining where the signals are sent within the fabric 8. The FABs 142 can operate in a variety of manners to perform these conversions and, in the present embodiment, employ interleaving algorithms as explained in more detail below in regards with FIGS. 3A-3B and Tables 1-3. In the present embodiment, each of the CAs 110, 114, 118, 122, 126, 130, 134 and 138 is pre-programmed for managing a subset of the main memory (e.g., certain subsets of the memory segments 26-36). The allocation of memory to the different CAs is known to the SADs 78 of the cores 46-76, such that the SADs are able to route the memory request signals to the appropriate CAs based upon the memory locations requested by the cores.

From the above discussion, it should be apparent that signals communicated between the cores 46-76 and the memory controllers 88-102 undergo several conversions as they proceed via the switches 80-86, the PAs 18-24, and the fabric 8. More particularly, a signal sent by one of the cores 46-76 undergoes a first conversion by the SAD 78 of the core, which results in the signal being communicated by the appropriate one of the switches 80-86 to an appropriate one of the PAs 18-24. Upon the signal being received at the appropriate one of the PAs 18-24, the FAB 142 of one of the CAs of the PA converts the signal into a signal appropriate for transmission over the fabric 8. As indicated above, this conversion at least in part involves a conversion of a physical memory address to a fabric address. After being transmitted through the fabric 8, the signal then arrives at another one of the PAs 18-24 (or potentially the same PA handling the signal before it entered the fabric), where the MTC 140 of one of the CCs of the PA again converts the fabric address back into a physical memory address. Finally, upon passing from that PA via another one of the switches 80-86 (or potentially the same switch as before) and arriving at an appropriate one of the MCs, the TAD 106 of that MC further converts the signal so that the desired memory location in main memory is accessed. Similar conversion processes occur when signals proceed in the opposite direction from the memory to the cores.

Although not necessarily the case, it is nonetheless often the case that the local physical address generated by the MTC 140 on the destination end of a given request differs from the local physical address generated by the SAD 78 on the request originating end. That is, the address sent to a MC as part of a memory read or write request is not necessarily the same physical address that was generated by the core that made the request. At the same time, while each memory location of the main memory can be referenced by way of a unique address, multiple locations within each of the memory segments 26-36 nevertheless can share the same address. As explained earlier, each of the memory segments 26-36 is a small, disjointed subset of the main memory. Consequently, the memory locations hosted within each of those memory segments can be accessed by using a smaller subset of the address that is used to access a location inside the main memory. Additionally, the MC view of the address cannot be used by that MC for coherency operations as the modified address can access an incorrect location.

From the above description, it should be evident that each of the cores 46-76 is capable of accessing all of the memory segments 26-36 regardless of whether those memory segments are controlled by the MCs located on the same socket or cell that supports the core requesting the memory access. Further, regardless of whether the MC governing a requested memory location is on the same or a different socket, or on the same or a different cell, than the core requesting the memory access, the request signal always passes through the fabric 8 as well as through one or more PAs 18-24 before entering and after leaving the fabric. By virtue of this "agent access memory" operation, a high level of interleaving occurs in which the core(s) of a given socket and cell potentially have access to many memory locations governed by many MCs of many different sockets and cells.

As a result, performance of the computer system 2 is enhanced relative to the performance of conventional computer systems, both in terms of achieving reduced levels of overall memory access latency and in terms of reducing the frequency with which hot-spots are encountered. In contrast to traditional schemes where on-socket MCs targeted at small configurations (e.g., computer systems with less than or equal to four sockets) provide a low-order interleave (e.g., by spreading memory requests across all available MCs), in at least some embodiments of the present invention, on-socket MCs can be used to provide interleave capabilities in large configuration computer systems such as those having 64 sockets. Further, while in conventional systems the interleave capabilities are incorporated into the cores themselves, which directly access the on-socket MCs to provide a low order interleave, in embodiments of the present invention the interleave capabilities are handled by the PAs instead of the cores, which leads to a high order interleave.

Figure 2:
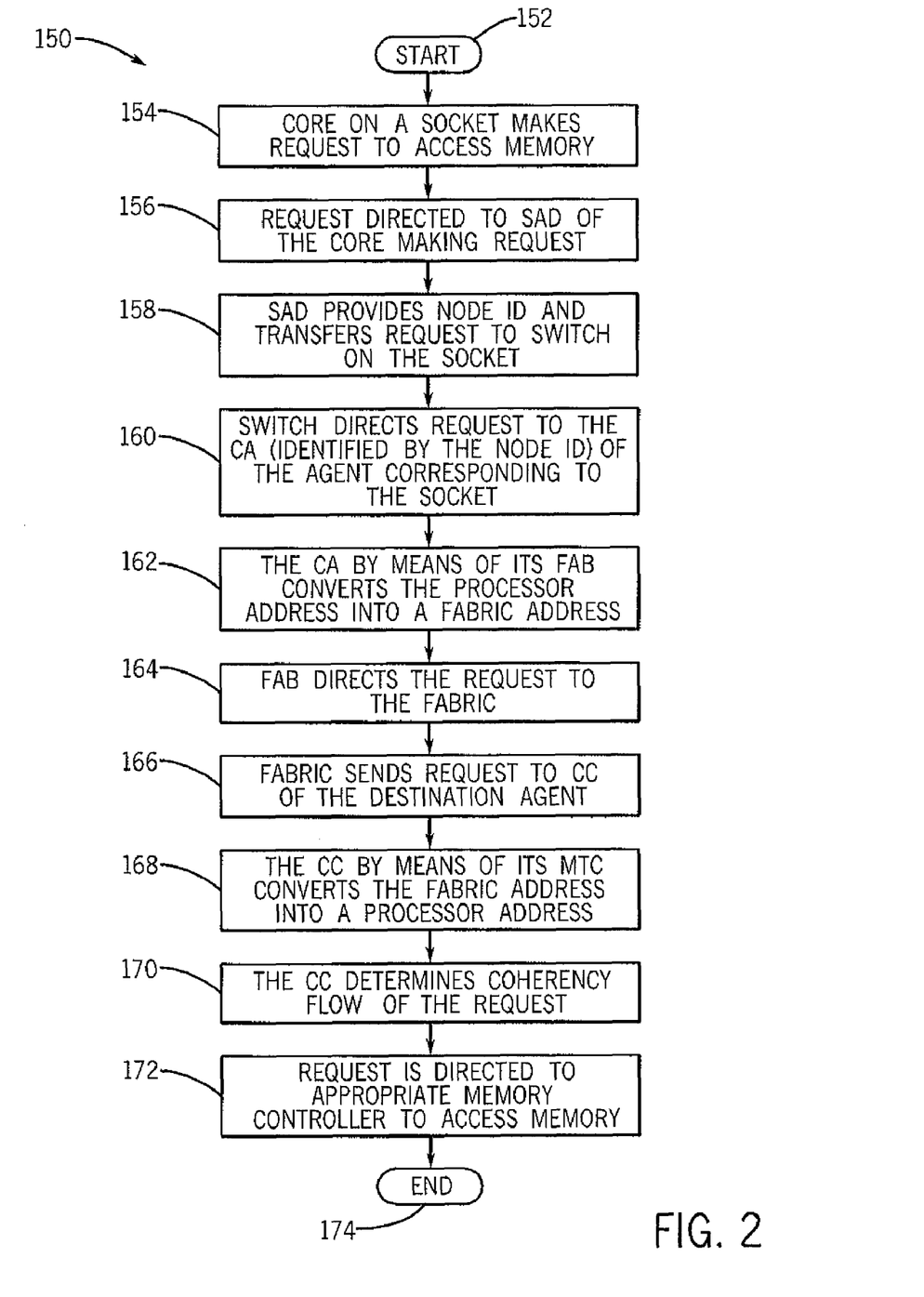
FIG. 2 is a flow chart showing exemplary steps of operation, which in particular relate to the accessing of memory in the computer system of FIG. 1 in accordance with one embodiment of the present invention.

Turning to FIG. 2, a flowchart 150 shows exemplary steps of operation of the computer system 2, which in particular relate to the accessing of a memory location hosted by one of the memory segments 26-36 in response to a request by one of the cores 46-76, in accordance with at least one embodiment of the present invention. As discussed above with respect to the exemplary links 144, 146, 147 and 148, in accordance with "agent access memory" operation, the PAs 18-24 and the fabric 8 are necessarily involved as intermediaries in the communications between the cores and MCs governing main memory, regardless of whether the cores and MCs happen to be positioned on the same or different cells or sockets. Thus, it should be understood that the same steps (or substantially the same steps) shown in the flowchart 150 can be performed to access a memory location regardless of whether the MC governing that memory location is located on a different cell (and socket) than the request originating core, on the same cell but on a different socket than the request originating core, or on the same cell and socket as the request origination core.

Figure 3A:
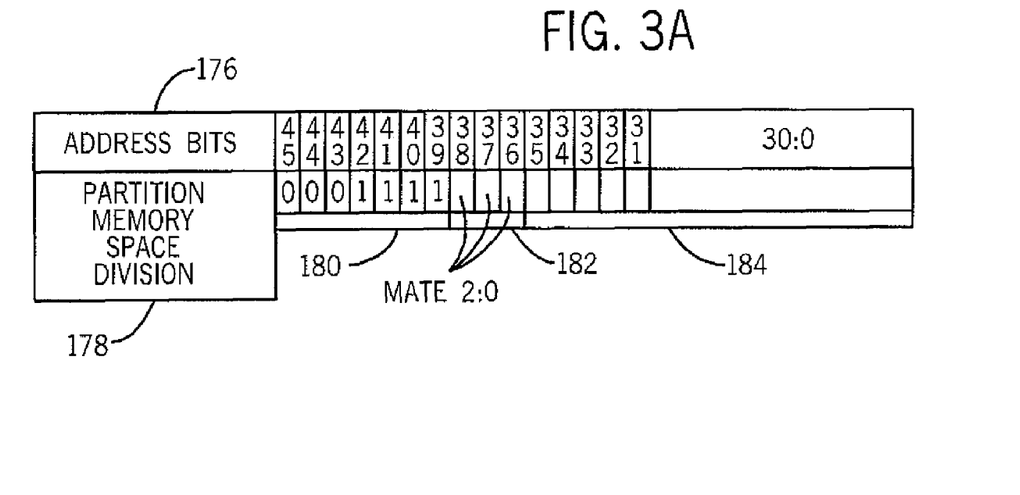
FIGS. 3A and 3B are schematic diagrams respectively illustrating an exemplary memory address reference and an exemplary manner of processing that memory address reference.

As shown in FIG. 2, the process of accessing a memory location begins at a step 152 and then proceeds to a step 154. At the step 154, a request to access a memory location hosted by one of the memory segments 26-36 is made by one of the cores 46-76. In particular, as part of the request, the requesting core provides a memory address indicating the partition memory space to which the requested memory segment belongs. One example of a format for a memory address is shown in FIG. 3A. In this example, the memory address includes a 46-bit address field 176 made up of bits [45:0] that are capable of identifying all memory segments within the entire memory space. As shown by a partition memory space division description field 178, the various bits of the 46-bit address field 176 are assigned values such that the overall set of assigned bits identifies a particular partition memory space division.

More particularly in the present example of FIG. 3A, a set of seven of the address bits 180 (namely, bits 45 through 39) provides an indication of the partition memory space to which the requested memory segment belongs. Additionally, a set of three more of the address bits 182 (namely, bits 38 through 36) identifies, in an indirect manner as set forth further below, specific interleaved regions within the identified segments and can be referred to as Memory Access Table Entries (MATEs). For the three-bit MATE entry of the present example, eight different MATEs are possible and can be present in a particular partition memory space. In addition to the bit set 180 and the bit set 182, the description field 178 further includes a further set of thirty-six of the address bits 184 (namely, bits 35 through 0), which identify respective memory blocks or M blocks within the various memory segments 26-36 of the various sockets 10-16. For the present 36-bit entry, each M block can be a capacity of 64 GB per MATE. Notwithstanding the above description concerning the exemplary embodiment of FIG. 3A, in other embodiments, the numbers of memory address bits of different types (including the division of the memory address into MATEs, and the capacity of each M block) can all be different from that presented above depending upon the type, requirements and needs of the computer system being used. In particular, the number of address bits determining the number of MATEs can often be larger than three bits.

Returning to FIG. 2, the request to access memory of the step 154 can be a read request to retrieve data or instructions from the memory location, or a write request to store data or instructions back into the memory location. The request can be made in response to a variety of circumstances including, for example, a command from a human operator or possibly another machine having control of the processing unit. It should be noted that, at the time of a memory request, the core making the request is not typically aware of the memory segment that is actually hosting the requested memory location. Rather, the memory segment hosting the specific memory location is determined only at a later time by way of one of the PAs 18-24. By relying upon the PAs 18-24 in this manner, the cores 46-76 are able to make requests without requiring knowledge concerning the memory hierarchy or the underlying interleave capabilities of the computer system 2.

After a request to access a memory location has been made in the step 154, the process advances to a step 156 where the request is directed to the SAD 78 of the respective core. Then, at a step 158, the SAD 78 assigns the request a node ID, after which the request is provided to the switch on the same socket on which is located the core. The node ID in particular identifies one of the CAs of one of the PAs that is located on the same cell as the core that issued the memory request in the step 154. For example, for a memory request originating at the core 52 on the cell 4 of FIG. 1, potentially any of the CAs 110, 114, 118 or 122 of either of the PAs 18 or 20 found on the same cell could potentially be identified by the SAD 78 of that core. The SAD 78 determines the node ID in any given instance by searching through a database to identify the CA that is responsible for managing the main memory subset encompassing the requested memory location. That is, while the SAD 78 does not know the actual physical locations of requested memory locations, the SAD does know which PAs/CAs are responsible for handling memory requests concerning memory locations within particular subsets of the main memory.

Upon the memory request and the node ID being provided to the appropriate socket switch from the SAD 78 at the step 158, the switch in turn directs the request to the CA identified by the node ID, at a step 160. Upon this information from the switch arriving at the appropriate CA, at a step 162 a conversion process is performed by which the requested memory address is converted into an actual, physical memory address and then further converted into a fabric address. In contrast to the SADs 78, the CAs are aware of how the main memory is divided into the memory segments 26-36, or at least which of the CCs 108, 112, 116, 120, 124, 128, 132, or 136, is governing the different memory segments. Thus, upon receiving a requested main memory address in the step 160, the CA first determines the CC that is hosting the requested memory segment containing that memory address. For example, referring to the exemplary paths 144-148 of FIG. 1 the respective CAs 126, 134, 110 and 114 are capable of determining that the requested memory locations are governed by the CC 108 (in the cases of the paths 144, 147 and 148), and the CC 136 (in the case of the path 146). In the present embodiment, to determine the CC responsible for the desired memory segment, the FAB 142 assigns the request a module ID as discussed in more detail below in regards with FIG. 3B.

Still at the step 162, after identifying the CC responsible for the memory segment hosting the requested memory location, the CA by means of its FAB 142 further converts the physical memory address into a fabric address. In at least some embodiments, the FABs 142 are pre-programmed to convert each unique main memory location into a corresponding fabric address. This conversion process can take various forms. For example, each fabric address can be a simple concatenation of the requested memory address, and an indication of the CC responsible for the memory segment identified by the CA as containing the requested memory address. Additionally, the FAB 142 further determines the number of ways the requested memory address can be interleaved across the various sockets 10-16, as also discussed with respect to FIG. 3B.

Figure 3B:
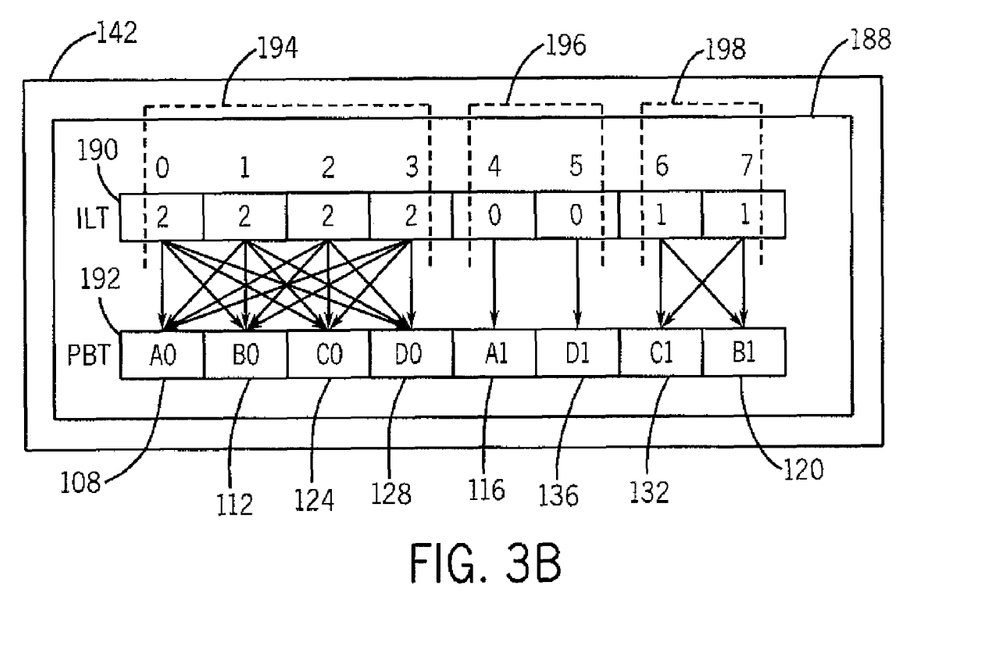

Turning then to FIG. 3B, internal processing of the FAB 142 that results in the correlation of CCs to different memory segments in an interleaved manner is illustrated schematically. As shown, the FAB 142 performs processing by way of a Memory Abstraction Table (MAT) 188, which can be implemented in hardware or software. The MAT 188 includes both an Interleave Table (ILT) 190 and a Physical Block Table (PBT) 192. The ILT 190 is a multi-entry table that correlates each given MATE entry (again, for example, determined by the set of address bits 182 of FIG. 3A) with a corresponding number of sockets across which the requested memory address is to be interleaved. In the present example, the number of entries within the ILT 190 is equal to 2 raised to the power of the number of bits of the MATE entry. That is, in the present example, in which each MATE entry has 3 bits, there are 2 to the power of 3 entries, that is, eight entries, in the ILT (the entries being numbered from 0 to 7). In alternate embodiments, the number of entries in the ILT 190 can vary from eight depending upon the number of bits of the MATE entries, or in other manners.

Further as shown, each entry of the ILT 190 is pre-programmed with a respective number of ways that the requested memory address is to be interleaved across the various sockets 10-16. More particularly, the number of ways for each entry is equal to 2 raised to the value of the respective entry. Thus, since each of the entries 0-3 of the ILT 190 has been pre-programmed with a value of 2, each of the memory addresses corresponding to those entries (e.g., MATE values 000 through 011) is to be interleaved across 4 of the CCs 108, 112, 124 and 128 as illustrated by arrows 194 (this is a "4-way" interleave). Also, since each of the entries 4 and 5 of the ILT 190 has been pre-programmed with a value of 0, each of the memory addresses corresponding to those entries (e.g., MATE values 100 and 101) is to be communicated only to a single respective one of the CCs 116 and 136, respectively, as illustrated by arrows 196 (this is a "1-way" interleave). Additionally, since each of the entries 6 and 7 has been pre-programmed with a value of 1, each of the memory addresses corresponding to those entries (e.g., MATE values 110 and 111) is to be interleaved across 2 of the CCs 132 and 120, as illustrated by arrows 198 (this is a "2-way" interleave).

Although it is the ILT 190 that determines the type of interleaving (e.g., 4-way, 2-way, or 1-way interleaving) that should be applied to each respective memory address corresponding to each respective MATE value, it is the PBT 192 that determines the particular CC or CCs to which any given memory address request should be directed and with respect to which any given memory address should be interleaved. More particularly, the PBT 192 is a multi-entry table implemented in either hardware or software, that provides the module ID of the CC servicing the memory request. In the present embodiment, the PBT 192 has eight entries that respectively provide the module IDs of the CCs of FIG. 1, namely, the CCs 108, 112, 124, 128, 116, 136, 132 and 120, respectively, which are A0, B0, C0, D0, A1, D1, C1 and B1. The number of entries in the PBT 192 matches the number of entries in the ILT 190, and the number of entries in both the PBT and ILT can be an arbitrary number determined by such factors as the number of address bits available and the desired granularity of memory blocks.

The arrows 194, 196 and 198 of FIG. 3B are intended to show how, in one example, the various entries of the ILT 190 corresponding to the various memory addresses are in fact interleaved among the various CCs 108, 112, 124, 128, 116, 136, 132 and 120 represented by the PBT entries. Thus, as shown in FIG. 3B, the memory addresses corresponding to the MATE entries 000 through 011 are each interleaved in a four-way manner among the CCs 108, 112, 124 and 128, the memory addresses corresponding to the MATE entries 100 and 101 respectively correspond to the CCs 116 and 136, respectively, and the memory addresses corresponding to the MATE entries 110 and 111 are each interleaved in a two-way manner among the CCs 132 and 120. It should be understood that the particular correspondences between the ILT entries and PBT entries of FIG. 3B are only illustrative, and that the particular correspondences will depend both upon the values of the ILT entries specifying the degrees of interleaving, as well as upon the values of the PBT entries corresponding to the ILT entries and the manner in which ILT entries correspond to PBT entries.

In the present embodiment, the particular PBT entry or entries corresponding to a given MATE entry/ILT entry is/are determined using a formula shown by equation (1) below. As is evident from that formula, the value of a particular PBT entry for a given memory address is calculated based upon (a) the given MATE entry (again, the values of memory address bits 38 through 36 of FIG. 3A), (b) the corresponding ILT entry data providing the number of ways of interleave, and (c) a 512 byte line offset (in this example, the values of memory address bits 11 through 9 within region 184 of FIG. 3A), as follows:

$$\text{PBT entry} = \text{MATE}\hat{\ }\{\sim(3'b111 \ll \text{ILT entry data}) \& \text{address}\} \quad (1)$$

where "^" is XOR, "~" is NOT, "<" is left shift, "&" is AND, and the "address" value is the value associated with address bits 11 through 9 in the set of address bits 184 of FIG. 3A. In other embodiments, algorithms/equations other than that mentioned above can instead be used to determine the PBT entries, depending upon the type and needs of the computer system being used.

Tables 1-3 show in further detail exemplary one-way, two-way, and four-way interleaving with respect to four sockets, which can for example be the sockets A-D of FIG. 1 (e.g., the sockets 10, 12, 14 and 16). For purposes of this example, it is assumed that each of the sockets A-D includes two memory blocks ("M blocks"), a M block 1 and a M block 0, and that these eight blocks can be respectively identified as shown as regions 0-7, respectively. Given these regions 0-7, Table 1 illustrates one-way, two-way and four-way interleaving as follows. For one-way interleaving, one M block contains all of the memory addresses associated with one MATE value. The regions 4 and 7 of Table 1 each can be understood as containing all of the memory addresses associated with first and second MATE values, respectively, and thus each provide one-way interleaving. For two-way interleaving, each of two M blocks contains half of the memory addresses associated with a given MATE value. In Table 1, for example, the regions 5 and 6 can each be understood to contain half of the memory addresses associated with two different MATE values, and thus provide this type of interleaving. As for four-way interleaving, each of four M blocks contains a quarter of the memory addresses associated with a given MATE value. Again with respect to Table 1, the regions 0-3 can each be understood to contain a quarter of the memory addresses associated with each of four different MAT values, and thus provide this type of interleaving.

TABLE 1

|  | Socket A | Socket B | Socket C | Socket D |
|---|---|---|---|---|
| MBlock 1 | 1-way 4 | 2-way 5 | 2-way 6 | 1-way 7 |
| Mblock 0 | 4-way 0 | 4-way 1 | 4-way 2 | 4-way 3 |

TABLE 2

| Memory block offset | Socket A | Socket B | Socket C | Socket D |
|---|---|---|---|---|
| 0x000 | +0x4 . . . 000 | *0x7 . . . 000 | **0x6 . . . 000 | ++0x5 . . . 000 |
| 0x001 | +0x4 . . . 001 | **0x6 . . . 001 | *0x7 . . . 001 | ++0x5 . . . 002 |
| 0x002 | +0x4 . . . 002 | *0x7 . . . 002 | **0x6 . . . 002 | ++0x5 . . . 002 |
| 0x003 | +0x4 . . . 003 | **0x6 . . . 003 | *0x7 . . . 003 | ++0x5 . . . 003 |
| 0x004 | +0x4 . . . 004 | *0x7 . . . 004 | **0x6 . . . 004 | ++0x5 . . . 004 |
| 0x005 | +0x4 . . . 005 | **0x6 . . . 005 | *0x7 . . . 005 | ++0x5 . . . 005 |
| 0x006 | +0x4 . . . 006 | *0x7 . . . 006 | **0x6 . . . 006 | ++0x5 . . . 006 |
| 0x007 | +0x4 . . . 007 | **0x6 . . . 007 | *0x7 . . . 007 | ++0x5 . . . 007 |
| 0x008 | +0x4 . . . 008 | *0x7 . . . 008 | **0x6 . . . 008 | ++0x5 . . . 008 |

TABLE 3

| Memory block offset | Socket A | Socket B | Socket C | Socket D |
|---|---|---|---|---|
| 0x000 | 0x0 . . . 000 | 0x1 . . . 000 | 0x2 . . . 000 | *0x3 . . . 000 |
| 0x001 | 0x1 . . . 001 | 0x0 . . . 001 | *0x3 . . . 001 | 0x2 . . . 001 |
| 0x002 | 0x2 . . . 002 | *0x3 . . . 002 | 0x0 . . . 002 | 0x1 . . . 002 |
| 0x003 | *0x3 . . . 003 | 0x2 . . . 003 | 0x1 . . . 003 | 0x0 . . . 003 |
| 0x004 | 0x0 . . . 004 | 0x1 . . . 004 | 0x2 . . . 004 | *0x3 . . . 004 |
| 0x005 | 0x1 . . . 005 | 0x0 . . . 005 | *0x3 . . . 005 | 0x2 . . . 005 |
| 0x006 | 0x2 . . . 006 | *0x3 . . . 006 | 0x0 . . . 006 | 0x1 . . . 006 |
| 0x007 | *0x3 . . . 007 | 0x2 . . . 007 | 0x1 . . . 007 | 0x0 . . . 007 |
| 0x008 | 0x0 . . . 008 | 0x1 . . . 008 | 0x2 . . . 008 | *0x3 . . . 008 |

Tables 2 and 3 further illustrate different types of interleaving across the sockets A-D. Table 2 in particular shows one and two-way interleaves across the sockets A-D. More particularly, sockets A and D show two one-way interleaves for MATE values 100 and 101 (respectively corresponding to entries 4 and 5 of the ILT 190 of FIG. 3B), where the first of the one-way interleaves for the MATE value 100 are labeled with a "+" and the second of the one-way interleaves for the MATE value 101 are labeled with a "++". Similarly, Table 2 shows sequential accesses according to each of the MATE values 110 and 111 (respectively corresponding to entries 6 and 7 of the ILT 190) incrementing diagonally through two M blocks on the two sockets B and C, as indicated respectively by the "*" and "" labels. Table 3 in addition shows a four-way interleave for the MATE values 000, 001, 010 and 011 (corresponding to entries 0, 1, 2 and 3 of the ILT 190**) incrementing diagonally through 4 M blocks on the four sockets A, B, C and D. This cycling action is highlighted by the marking of the values corresponding to the MATE value 011 with the "*" label.

Returning to FIG. 2, upon determining the fabric address and the module ID at a step 164 the FAB 142 then causes the memory request as formatted by the CA/FAB to be routed onto the fabric 8 to the destination PA. Next, at a step 166, the fabric 8 directs the memory request as processed by the CA/FAB to the appropriate CC of the appropriate destination PA as was determined by the FAB. As discussed above, the destination PA can be the same PA that provided the memory request onto the FAB, or a different PA, and the destination cell can be the same cell as the request originating cell or a different cell. Further, upon receiving the request from the fabric 8, at a step 168 the MTC 140 of the CC of the destination PA converts the fabric address of the received memory request back to the local physical address specifying the location of memory to be accessed. The fabric address received via the fabric 8 is converted to the physical address before the coherency flow of the request is determined.

Upon the converting of the fabric address into the local physical address, at a step 170 the CC that received the request then determines the coherency flow of the request. As discussed above, in the present embodiment the CC performs a directory type cache coherency control to resolve coherency conflicts. By searching the directory for the requested memory location, the CC determines the most recent residence of the memory location. If the most recent residence of the requested memory location is present in the cache memory of one of the cores in the computer system 2, a snoop is issued to the CA associated with that core which can then forward the snoop to a local core. Snoops can be issued even if the cache memory having the copy of the memory location is on the same socket as the MC managing the memory segment holding the requested memory location. If at the step 170 a snoop is issued to one of the CAs, the CA obtains the data from the appropriate cache and that data is then that information is transferred back to the CC of the requesting PA, which subsequently returns the data to the requesting core via the requesting CA.

Assuming however that the CC in the step 170 determines after searching its directory that the latest copy of the requested memory location is in the memory segment controlled by the MC identified in the step 162, the process advances to a step 172. In this step, the CC provides the MC with a request signal including the actual physical memory address corresponding to the memory location that was originally requested by the core originating the process at the step 154. At the same time, while the actual physical memory address corresponds to the originally-requested memory location, the address sent to the MC is not necessarily the exact same physical address that was generated by the request-initiating core, although the format of the address typically is the same. Upon receiving the memory request from the CC, the MC transfers the request to its TAD 106 for converting the request into a bank address for retrieving the memory location requested. The data accessed is then transmitted to the core that requested the memory access via the requesting CA. The process then ends at a step 174.

While the process described above with respect to the flow chart 150 of FIG. 2 is one example of a process by which the memory interleave capabilities of a multiprocessor system can be expanded by enabling simultaneous accesses to multiple memory segments in a computer system via an "agent access memory" process, the present invention is also intended to encompass a variety of other processes, including modifications and/or refinements of the above-described process, allowing for memory interleaving. The particular process steps employed above to facilitate memory interleaving, the cache coherency protocols employed by the cache coherency controller, the interleave algorithm employed by the processor agents and other features can all be varied depending upon the type/needs of the computer system being used and the memory being used.

It is specifically intended that the present invention not be limited to the embodiments and illustrations contained herein, but include modified forms of those embodiments including portions of the embodiments and combinations of elements of different embodiments as come within the scope of the following claims.

We claim:

1. A computer system comprising:

memory devices having first and second memory segments;

a first socket having a first processing core and a first memory controller, wherein the first memory controller is configured to manage access of the first memory segment;

a second socket having a second processing core and a second memory controller, wherein the second memory controller is configured to manage access of the second memory segment;

a fabric; and a first processor agent associated with the first socket, wherein the first processor agent includes a first coherency controller, wherein the first coherency controller includes a first memory translation cam (MTC), wherein the first MTC is configured to convert a fabric address into a local physical address that is in turn provided to the first memory controller, and wherein the first memory controller is configured to access a particular memory location within the first memory segment based upon the local physical address; and a second processor agent associated with the second socket, wherein the first processor agent is configured to:

convert an address of a first memory request, issued by the first processing core for accessing the second memory segment, to a first fabric address, send the first memory request, as modified to include the first fabric address, over the fabric to the second processor agent to cause the second processor agent to convert the first fabric address to a first physical address specifying a memory location of the second memory segment, convert an address of a second memory request, issued by the first processing core for accessing the first memory segment, to a second fabric address, send the second memory request, as modified to include the second fabric address, over the fabric, wherein the modified second memory request is destined to the first processor agent, and convert the second fabric address to a physical address specifying a memory location of the first memory segment.

2. The computer system of claim 1, wherein all memory requests of the first processing core that are intended for either the first or second memory segment are to be directed by way of one or both of the first and second processor agents and the fabric.

3. The computer system of claim 1, wherein the first socket has a first switch, and the second socket has a second switch, wherein the first switch is configured to route the first memory request from the first processing core to the first processor agent, and the second switch is configured to route the first memory request from the second processor agent to the second memory controller.

4. The computer system of claim 1, wherein the first processing core includes a first source address decoder (SAD) configured to identify the first processor agent among plural processor agents to which the first memory request should be directed from the first processing core.

5. The computer system of claim 4, wherein the first SAD is configured to determine that the first memory request should be directed to the first processor agent by determining that the first memory request is directed to a memory location that within a first memory subset of the memory devices.

6. The computer system of claim 1, wherein the first coherency controller is configured to perform a coherency conflict check prior to forwarding a particular memory request to the first memory controller, and wherein the coherency conflict check involves at least of (i) consulting a directory cache and (ii) performing a snoop.

7. The computer system of claim 1, wherein the first socket has plural processing cores, and the second socket has plural processing cores.

8. The computer system of claim 7, further comprising:

a first cell including the first socket and a third socket having plural processing cores and a third memory controller; and a second cell including the second socket and a fourth socket having plural processing cores and a fourth memory controller.

9. A computer system comprising:

a first core;

at least one memory device including a first memory segment;

a first memory controller coupled to the first memory segment;

a fabric; and at least one processor agent coupled at least indirectly to the first core and the first memory segment, and also coupled to the fabric, wherein the at least one processor agent is configured to route a first memory request of the first core in relation to a first memory location within the first memory segment to the first memory controller by way of the fabric, wherein the at least one processor agent includes a first processor agent, and wherein the first processor agent includes a first caching agent, wherein the first caching agent includes a first fabric abstraction block, wherein the first fabric abstraction block is configured to convert a first memory address pertaining to the first memory location into a first fabric address, to cause the first memory request to proceed via the fabric from the first processor agent to a second processor agent based upon the first fabric address, and wherein the first fabric abstraction block is configured to determine a manner of interleaving the physical memory locations corresponding to the first memory address and at least one additional memory address.

10. A first processor agent capable of being incorporated into a computer system having plural sockets, wherein a first of the plural sockets includes a first processing core and a first memory controller to manage access of a first memory segment, and a second of the plural sockets includes a second processing core and a second memory controller to manage access of a second memory segment, the first processor agent comprising:

a first caching agent; and a first coherency controller, wherein the first caching agent is configured to convert a first physical address of a first memory request relating to a memory location into a first fabric address, wherein the first memory request is issued by the first processing core, wherein the first processor agent is configured to cause the first memory request, as modified to include the first fabric address, to be sent over a fabric to a second processor agent to cause the second processor agent to convert the first fabric address of the modified first memory request into a physical address to access a location of the second memory segment, and wherein the first caching agent is configured to convert a second physical address of a second memory request into a second fabric address, wherein the second memory request is issued by the first processing core, and wherein the first processor agent is configured to cause the second memory request, as modified to include the second fabric address, to be sent over the fabric to the first processor agent, and wherein the first coherency controller is configured to convert the second fabric address of the modified second memory request into a physical address relating to a memory location in the first memory segment, and wherein the first caching agent includes a first fabric abstraction block that is configured to convert the first physical address into the first fabric address, and the first coherency controller includes a first memory translation cam that is configured to convert the second fabric address into the physical address relating to the memory location in the first memory segment.

11. The first processor agent of claim 10, wherein the first coherency controller is configured to perform a directory search to determine a most recent resident of a particular memory location, and to issue snoops.

12. A system comprising the first processor agent of claim 10, the second processor agent, and the fabric by which the first and second processor agents are in communication with one another.

13. A processor agent capable of being incorporated into a computer system, the processor agent comprising:

a first caching agent; and a first coherency controller, wherein the first caching agent is configured to convert a first physical address relating to a memory location into a first fabric address, and wherein the first coherency controller is configured to convert the first fabric address into at least one of the first physical address and a second address relating to the memory location, wherein the first caching agent is configured to convert the first physical address and additional physical addresses into the first fabric address and additional fabric addresses by:

(i) determining an amount of interleaving appropriate for each of the physical addresses; and (ii) identifying at least one target coherency controller in relation to each of the physical addresses, the identifying being based upon the respective determined amount of interleaving and the respective physical address.

14. A method of accessing memory locations in a computer system, the method comprising:

receiving, at a first processor agent, a first signal indicative of a first memory request generated by a processing core;

communicating a second signal based upon the first signal from the first processor agent to a second processor agent, via a fabric;

sending a third signal based upon the second signal from the second processor agent, for receipt by a first memory controller, wherein the first memory controller in response to receiving the third signal accesses a first one of the memory locations;

receiving, at the first processor agent, a fourth signal indicative of a second memory request generated by the processing core;

communicating a fifth signal based upon the fourth signal from the first processor agent via the fabric back to the first processor agent; and sending a sixth signal based upon the fifth signal from the first processor agent for receipt by a second memory controller, wherein the second memory controller in response to receiving the sixth signal accesses a second one of the memory locations.

15. The method of claim 14, wherein the second signal includes a fabric address determined by the first processor agent based upon a first physical address received in the first signal, and wherein the third signal includes a further address determined by the second processor agent based upon the fabric address.

16. A method of accessing a memory location in a computer system, the method comprising:

receiving, at a first processor agent, a first signal indicative of a memory request generated by a core;

communicating a second signal based upon the first signal from the first processor agent to one of the first processor agent and a second processor agent, via a fabric;

sending a third signal based upon the second signal from the one processor agent, for receipt by a memory controller, whereby the memory controller in response to receiving the third signal is capable of accessing the memory location; and converting a first physical address received in the first signal into at least one fabric address, wherein the converting includes determining a degree of interleaving corresponding to the first physical address.

17. The method of claim 16, wherein the converting further includes determining a socket memory block based upon the degree of interleaving and the first physical address.

* * * * *

UNITED STATES PATENT AND TRADEMARK OFFICE
CERTIFICATE OF CORRECTION

PATENT NO.         : 7,818,508 B2                                      Page 1 of 1
APPLICATION NO.    : 11/741453
DATED              : October 19, 2010
INVENTOR(S)        : Bryan Hornung et al.

It is certified that error appears in the above-identified patent and that said Letters Patent is hereby corrected as shown below:

In column 18, lines 53-56, in Claim 11, delete
"wherein the first coherency controller
is configured to perform a directory search to determine a
   most recent resident of a particular memory location,
and to issue snoops." and insert
-- wherein the first coherency controller is configured to perform
   a directory search to determine a most recent resident of a
   particular memory location, and to issue snoops. --, therefor.

Signed and Sealed this
Fifteenth Day of March, 2011

David J. Kappos
*Director of the United States Patent and Trademark Office*